Patented Feb. 6, 1951

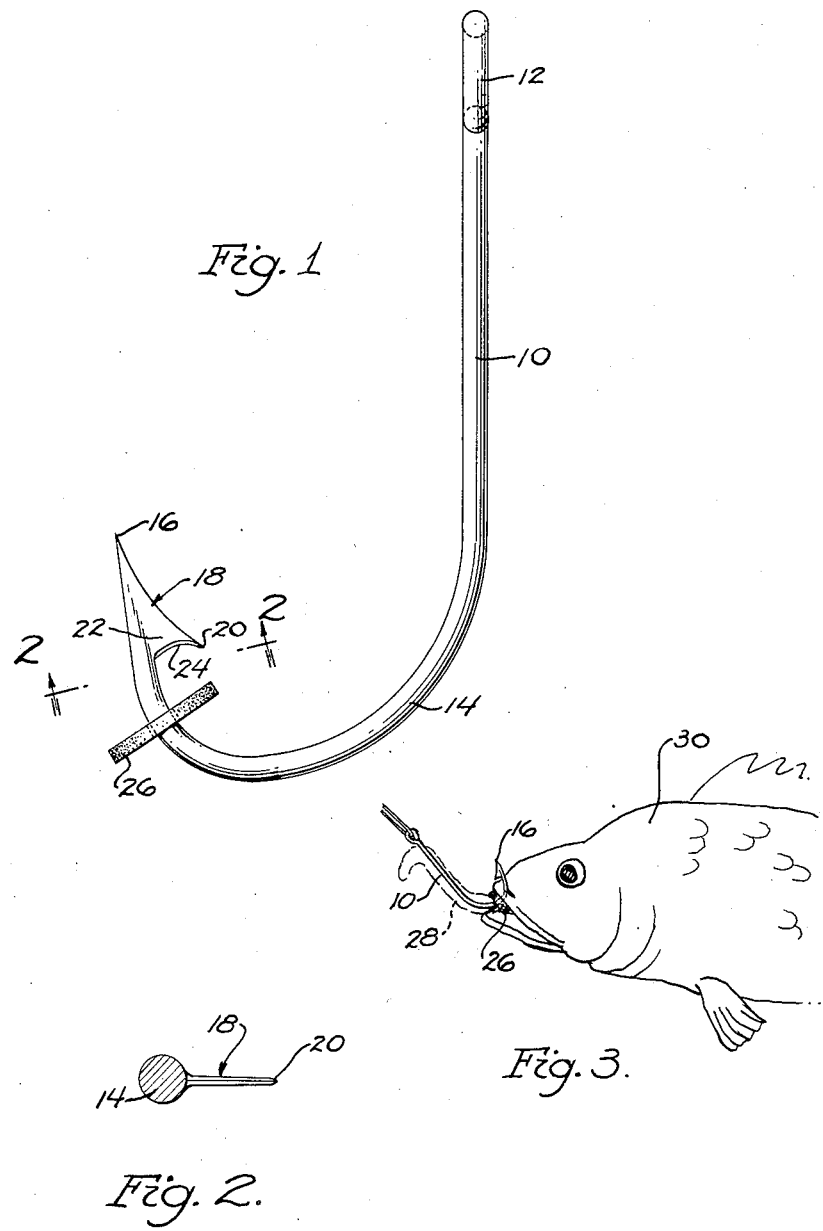

2,540,276

UNITED STATES PATENT OFFICE 2,540,276

FISHHOOK

Harvey T. Moler, Berkley, Mich.

Application May 15, 1948, Serial No. 27,310

5 Claims. (Cl. 43—43.16)

This invention relates to a fish hook of a type designed to facilitate removal of a fish from the hook after it has been engaged thereby and landed.

An object of the invention is to provide an improved fish hook which without impairing its efficiency in engaging and impaling the fish may yet be easily disengaged therefrom after the fish has been landed.

Further objects and advantages of the invention will be apparent from the following description, taken in connection with the appended drawing, in which:

Fig. 1 is an enlarged view in elevation of a fish hook embodying the invention.

Fig. 2 is a sectional view taken on the line 2—2 of Fig. 1.

Fig. 3 is a view on a smaller scale showing the hook in engaged position.

It is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

The device shown in the drawing comprises a hook proper having a shank 10 and an eye 12, the lower part of the shank being formed with a loop 14 terminating in a point 16, all of usual construction. Adjacent the point 16 is formed an integral backwardly (with the respect to the point 16) and inwardly extending barb 18 which terminates in a point 20. A web 22 connects the barb to the loop 14, and at its lower or rear edge is formed with a cutting edge 24.

Mounted on the loop 14 is a disk 26, of rubber or other stretchable material, having a central aperture whereby the disk may be slipped over the point 16 and barb 18 after the hook is baited, and designed to form a shield for the edge 24 to prevent the same from cutting the bait, live or otherwise, which is mounted on the shank.

In the operation of the device, the hook will be baited in the usual manner, with bait of any desired sort indicated at 28 in Fig. 3, and the disk 26 will then be slipped over the point 16 and positioned below or at the rear of barb 18. When a fish 30 has seized the bait the point 16 will penetrate its flesh in the usual manner and disk 26 will thereby be slid back along the loop 14 as shown in Fig. 3. When the fish has been landed, the angler will turn the hook to the most advantageous position and will press downwardly (Fig. 1) on it, causing the cutting edge 24 to cut the tissues with which it comes in contact. By repeating the process, an aperture in the tissues will be formed through which the barb 18 may be withdrawn to thereby disengage the fish.

Although the invention has been described with reference to a particular embodiment thereof, it may be embodied in other forms within the skill of artisans in this art, and is therefore not limited except in accordance with the terms of the following claims.

I claim:

1. A fish hook comprising a shank formed at one end with an eye and at its other end with a point and a backwardly and inwardly extending barb, and a web connecting said shank and said barb and terminating at its rear edge in a cutting edge.

2. A fish hook comprising a shank having an eye at one end and formed with a loop terminating in a point, a backwardly and inwardly extending barb adjacent said point and a web connecting said loop and said barb and having its rear edge terminating in a cutting edge.

3. A fish hook comprising a shank formed with a penetrating point and a backwardly and inwardly extending barb, a rear portion of said barb being formed with a cutting edge.

4. A fish hook comprising a metallic shank formed with a point and a backwardly and inwardly extending barb terminating in a point, the metal between the point of the barb and the shank being formed with a rearwardly directed cutting edge.

5. A fish hook comprising a shank designed to receive bait and formed with a loop terminating in a forwardly directed point, a backwardly and inwardly directed barb integral with said shank, a web connecting the barb to the shank rearwardly of the point and having its rear edge formed with a knife edge, and an elastic ring mounted on said loop to protect the bait from said knife edge.

HARVEY T. MOLER.

REFERENCES CITED

The following references are of record in the file of this patent:

UNITED STATES PATENTS

| Number | Name | Date |
|---|---|---|
| 239,111 | O'Meara | Mar. 22, 1881 |
| 746,006 | Brigham | Dec. 8, 1903 |
| 912,146 | Moffett | Feb. 9, 1909 |
| 1,430,626 | Christensen | Oct. 3, 1922 |
| 1,546,975 | Feller | July 21, 1925 |
| 1,851,370 | Munger | Mar. 29, 1932 |
| 2,164,807 | Evans | July 4, 1939 |
| 2,234,516 | Clark | Mar. 11, 1941 |
| 2,241,367 | Sarff | May 6, 1941 |